United States Patent Office 3,027,356
Patented Mar. 27, 1962

3,027,356
PRODUCTION OF N-SUBSTITUTED POLYAMIDES
Otto von Schickh and Robert Gehm, Ludwigshafen (Rhine), and Manfried Paul, deceased, late of Ludwigshafen (Rhine), by Ursula Renate Doris Paul, heir and legal representative of heirs, Ludwigshafen (Rhine), all of Germany, assignors to Badische Anilin- & Soda-Fabrik Aktiengesellschaft, Ludwigshafen (Rhine), Germany
No Drawing. Filed July 3, 1959, Ser. No. 825,864
Claims priority, application Germany July 5, 1958
6 Claims. (Cl. 260—78)

This invention relates to the production of N-substituted polyamides, and more particularly to a process for preparing polyamides which are substituted on the nitrogen atom by a hydrocarbon group, especially an alkyl group.

It has hitherto been though that it would be difficult or impossible to polymerize lactams substituted on nitrogen. In particular it was believed that it would be impossible to prepare polyamides from N-alkyl lactams (see Chem. Zentralbl. 1944, I, page 349). In the production of polyamides substituted on nitrogen it has therefore hitherto been usual to start from ready-made polymers and subsequently to react these with appropriate reagents.

However during the subsequent reaction the polyamides are readily attacked, thus leading for example to a reduction in the degree of polymerization. The finished polymers therefore possess relatively poor mechanical properties.

One object of this invention is to provide a process for the production of N-substituted polyamides, in which the initial materials are N-substituted lactams, so that no subsequent reaction of the polyamides is necessary in order to obtain N-substituted products.

A further object of this invention is to provide a process for the production of polyamides which are substituted on the nitrogen atom by hydrocarbon radicals, especially alkyl groups, having 1 to 6 carbon atoms.

These objects are achieved by heating lactams of omega-aminocarboxylic acids which have 7 to 12 carbon atoms in the ring and which are substituted on the nitrogen atom by a hydrocarbon radical, especially an alkyl group, having 1 to 6 carbon atoms, at 200° to 300° C. in the presence of neutral to acid catalysts. Accordingly, the belief that N-alkyl lactams could not be polymerized is only true for those compounds with less than 7 carbon atoms.

Examples of lactams substituted on nitrogen which can be reacted according to this invention to give polyamides are N-methyl-oenanthic lactam, N-ethyl-oenanthic lactam, N-methyl-caprylic lactam, N-ethyl-caprylic lactam or N-methyllauric lactam. The corresponding compounds substituted by propyl, butyl, isobutyl, isoamyl or hexyl groups on the nitrogen are also suitable.

Lactams with 7 to 12 carbon atoms in the ring, which are substituted on the nitrogen atom by a hydrocarbon radical having 1 to 6 carbon atoms and having not more than one ethylenically-unsaturated bond may also be polymerized according to this invention. Lactams of the said type are for example, N-vinyl, N-allyl, N-crotyl, N-methallyl or N-hexene-(4)-yl substituted lactams. Similarly, the hydrogen of the methylene groups of the ring may also be replaced by alkyl groups.

N-alkyl lactams may be prepared from the unsubstituted lactams by reaction with the usual alkylating agents, as for example with alkyl iodides or dialkyl sulfates. N-alkenyl lactams may be prepared by vinylation on the nitrogen atom with acetylene. The N-alkenyl lactams may be further reduced to give N-alkyl substituted lactams.

For the production of the polyamides, the N-substituted lactams are heated for some time, as a rule 2 to 20 hours, at 200° to 300° C. in the presence of a neutral to acid polymerization catalyst. The preferred reaction temperatures lie between 250° and 280° C. Suitable polymerization catalysts are those neutral or acid catalysts known for the polymerization of caprolactam. Examples of acid catalysts are strong mineral acids such as phosphoric acid, sulfuric acid or hydrobromic acid. Crystalline phosphoric acid is an especially effective catalyst. Examples of neutral catalysts are dicarboxylic acid salts of aliphatic diamines, such as hexamethylene diamine adipate or octamethylene diamine sebacate, aminocarboxylic acids, such as omega-amino-caproic acid, or water. If water is used as the catalyst, it is necessary to carry out the polymerization in a closed vessel under pressure in order to prevent the boiling off of the water. Alkaline compounds, such as sodium metal or sodium hydroxide, with which caprolactam may be polymerized well, are however ineffective with the N-substituted lactams. The polymerization catalysts are used in amounts of 0.1 to 5% by weight, preferably 0.3 to 3% by weight with reference to the weight of the polyamide-forming compound.

It will be recognized that the above catalysts are well known compounds for the polymerization of caprolactam but that for the purpose of the present invention alkaline compounds must be excluded, i.e., the caprolactam catalysts of this invention are limited to those which in aqueous solution exhibit a pH of not more than 7.

The polyamides obtained from the N-alkenyl lactams may be used for the production of crosslinked products. The substituted lactams may also with advantage be polymerized in admixture with other polyamide-forming compounds.

The polyamides obtained according to the process of this invention are tough viscous masses which do not crystallize. They are insoluble in water but dissolve very readily in alcohols and other organic solvents. The copolymers, depending on their composition, are viscous or solid soft masses which in some cases may be crystalline. These polyamides may be used well as adhesives, particularly for binding polyamide films.

The following examples will further illustrate this invention but the invention is not restricted to these examples. The parts specified are parts by weight.

*Example 1*

100 parts of N-methyl-caprylic lactam are heated at 260° C. with 1.5 parts of crystalline phosphoric acid for 18 hours while excluding oxygen. The highly viscous liquid obtained has a k-value of 51.6 (measured in concentrated sulfuric acid).

*Example 2*

200 parts of N-ethyl-caprylic lactam are polycondensed as in Example 1 with 3 parts of pyrophosphoric acid. The polymer is a pale yellow liquid of the k-value 39.

*Example 3*

100 parts of N-ethyl-caprylic lactam are heated for 15 hours at 260° C. with 0.5 part of crystalline phosphoric acid in a nitrogen atmosphere free from oxygen. A pale highly viscous liquid of the k-value 36.6 is formed.

*Example 4*

100 parts of N-ethyl-oenanthic lactam are heated up to 260° C. within 3 hours with 2 parts of crystalline phosphoric acid in a nitrogen atmosphere free from oxygen and then kept at this temperature for another 10 hours. The final polyamide has a k-value of 32.5 (measured in concentrated sulfuric acid) and is a viscous pale yellow liquid. If the polymer is heated for another hour at 260° C. in a vacuum of 0.5 mm. Hg, the k-value rises to 38.4.

Example 5

20 parts of N-ethyl-oenanthic lactam and 80 parts of caprolactam are treated with 1 part of crystalline phosphoric acid as in Example 1. A crystalline soft polyamide of the melting point 193° to 198° C. is obtained. The k-value is 58.6 (measured in concentrated sulfuric acid).

Example 6

100 parts of N-ethyl-caprylic lactam and 900 parts of caprolactam are heated as in Example 1 with 10 parts of phosphoric acid for 15 hours at 260° C. The polyamide formed is crystallized and has a melting point of 206° C. and a k-value of 62.5. It may be worked up into films, threads and foils.

Example 7

Within 4 hours 20 parts of N-methyl-caprylic lactam are heated to 260° C. with 10 parts of water in a closed vessel. The pressure meanwhile rises to 13 atmospheres. The product is decompressed during the course of 15 minutes and then kept under nitrogen at normal pressure and 260° C. for a further 14 hours. A pale yellow viscous oil of the k-value 20.4 is obtained.

Example 8

20 parts of N-methyl-caprylic lactam and 0.4 part of hexamethylene diamine adipate are heated within 4 hours to 260° C. and kept for a further 14 hours at this temperature. A viscous oil of the k-value 18 is obtained.

Example 9

100 parts of N-butyl-caprylic lactam are heated for 18 hours at 260° C. with the exclusion of oxygen together with 1.5 parts of crystalline phosphoric acid. A colorless viscous liquid with a k-value of 26.3 is obtained.

Example 10

100 parts of N-butyl-oenanthic lactam are heated as described in Example 9. There is obtained a liquid which is still viscous and has a k-value of 17.3.

We claim:
1. Process for the production of N-substituted polyamides which comprises heating from 200° to 300° C. a lactam of an ω-amino carboxylic acid with from 7 to 12 carbon atoms in the ring, said lactam being substituted on its nitrogen atom by an alkyl radical with from 1 to 6 carbon atoms, in the presence of a caprolactam polymerization catalyst which in aqueous solution exhibits a pH of not more than 7.

2. Process for the production of N-substituted polyamides which comprises heating from 200° to 300° C. a lactam of an ω-amino carboxylic acid with from 7 to 12 carbon atoms in the ring, said lactam being substituted on its nitrogen atom by an alkyl radical with from 1 to 6 carbon atoms, in the presence of phosphoric acid.

3. Process for the production of N-substituted polyamides which comprises heating from 200° to 300° C. a lactam of an ω-amino carboxylic acid with from 7 to 12 carbon atoms in the ring, said lactam being substituted on its nitrogen atom by an alkyl radical with from 1 to 6 carbon atoms, in the presence of water at elevated pressure.

4. Process according to claim 1, which comprises heating N-methyl-caprylic lactam from 200° to 300° C., in the presence of a caprolactam polymerization catalyst which in aqueous solution exhibits a pH of not more than 7.

5. A process for the production of N-substituted polyamides which comprises heating from 200° to 300° C., a lactam of an ω-amino carboxylic acid with 7 to 12 carbon atoms in the ring, said lactam being substituted on its nitrogen atom by an alkyl radical with from 1 to 6 carbon atoms, in the presence of a caprolactam polymerization catalyst selected from the group consisting of water, strong mineral acids, dicarboxylic acid salts of aliphatic diamines and aminocarboxylic acids.

6. A process as claimed in claim 5 wherein oxygen is excluded from the reaction.

References Cited in the file of this patent
UNITED STATES PATENTS
2,241,321    Schlack _____ May 6, 1941